G. W. MOSHER.
AUTOMOBILE MIRROR.
APPLICATION FILED OCT. 20, 1913.
1,139,560.
Patented May 18, 1915.
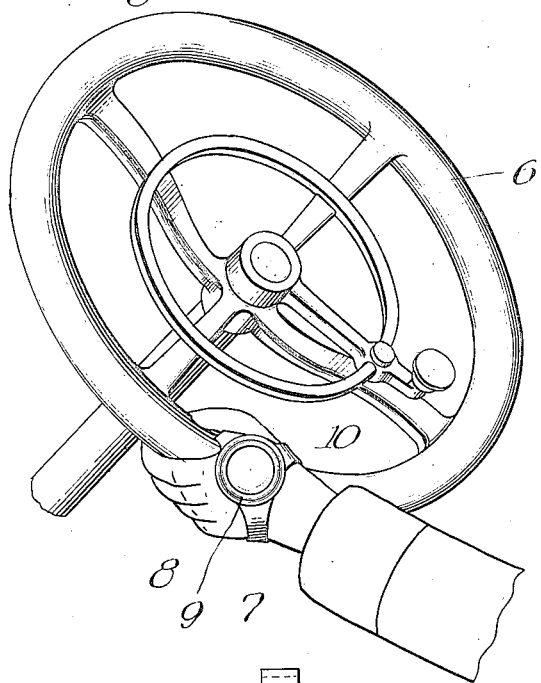
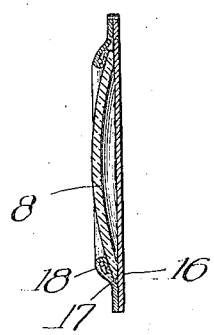
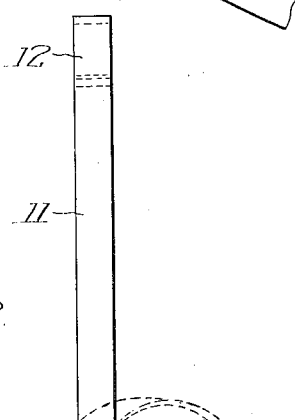
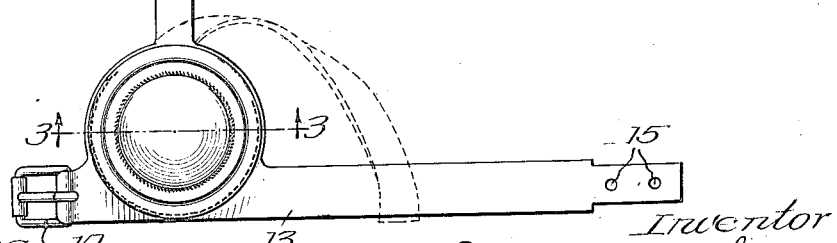

UNITED STATES PATENT OFFICE

GEORGE W. MOSHER, OF CHICAGO, ILLINOIS.

AUTOMOBILE-MIRROR.

1,139,560.  Specification of Letters Patent.  Patented May 18, 1915.

Application filed October 20, 1913. Serial No. 796,361.

*To all whom it may concern:*

Be it known that I, GEORGE W. MOSHER, a citizen of the United States, residing at Chicago, in the county of Cook and State of Illinois, have invented certain new and useful Improvements in Automobile-Mirrors, of which the following is a specification.

My invention relates to mirrors provided for use in motoring to enable the driver of the automobile to see the condition of the traffic behind the car and at the side of the car. Prior to my invention, so far as I am aware, the mirrors provided for this purpose have been mounted in suitable brackets secured to a side of the wind-shield or upon some other part of the car. These mirrors have been large and have obstructed to some extent the forward view of the driver. They have been the source of frequent inconvenience and annoyance, as the jarring of the automobile loosens the mirror upon the bracket or the bracket on its support throwing the mirror out of adjustment and not infrequently breaking the glass of the wind shield.

It is one of the principal objects of my invention to obviate the necessity of providing these large mirrors, which in addition to possessing the disadvantages already set forth are costly because of their size and must be placed in an inconvenient location.

A further object of the invention is to provide a mirror which may be secured on the hand of the driver adjacent the side of the car, and which, therefore, will not obstruct the direct view of the driver in any direction and where with a slight movement of his hand the driver will be able to see the street or road beside and behind him and avoid collision due to too sudden turning or stopping of his own car.

Another object and advantage is to provide a mirror which may be positioned on the hand of the driver which will permit him to look behind and at the side of the car without turning his head and, where a large steering wheel is provided, without moving his hand.

An additional object of the invention is to provide a device of the character described which will not interfere with the free use of the hand carrying the same, which may be worn comfortably and on either hand, and which will be simple in construction, cheap to manufacture and durable in use.

Other objects and advantages of the invention will be apparent as it is better understood from the following description when taken in connection with the accompanying drawing, illustrating a preferred embodiment thereof.

On the drawing, Figure 1 is a perspective view of a hand of a driver equipped with an embodiment of my invention and operating a steering wheel; Fig. 2 is an enlarged plan view of the device shown in Fig. 1, and Fig. 3 is a transverse section through the holder, taken substantially on the line 3—3 of Fig. 2.

Referring to the drawing, reference character 6 designates the steering wheel of an automobile and reference character 7 the left hand of a driver operating the same. In the present instance the steering wheel is shown as being located adjacent the left side of the car and the mirror 8 is preferably on the left hand of the driver, or the hand adjacent the side of the car. The mirror is held on the back of the hand and adjacent the thumb, so that when the hand grasps the steering wheel in the ordinary manner the mirror is inclined outwardly and rearwardly in position, when the wheel is large and high, to permit the driver to obtain a view rearwardly and at the side of the car by merely glancing at the mirror.

The mirror 8 is disposed in a holder 9 to which is secured a harness 10 encircling the wrist and passing between the thumb and first finger of the hand 7. The harness in the present instance consists of a thumb strap 11 extending out from the top edge of the holder and adapted to pass between the first finger and thumb. The strap 11 is provided at its free end with a loop 12 through which a wrist band 13, secured across the bottom of the holder, is adapted to pass, as shown in dotted lines in Fig. 2, the thumb strap and wrist band being disposed substantially at right angles to each other when disconnected as seen in Fig. 2. The wrist band is preferably provided with a buckle 14 at one end and with suitable holes 15 adapted to engage the buckle to secure the device in place upon the hand of a user at the other. The holder consists of a backing sheet 16 of circular form and of suitable material upon which is stitched or otherwise secured a ring 17 of leather or the like, the inner edge of the ring being reinforced as at 18 which prevents distortion of the ring and holds the mirror 8 in place. The fastening between the ring 17 and backing 16 preferably extends only about a part of the circumference, sufficient space being left to permit the mirror to be pushed between the two into position.

I prefer to construct the harness and backing sheet 16 of one piece of soft flexible leather and to construct the ring 17 of some thicker material as heavier leather, although it will be apparent that flexible material of various kinds may be used without departing from the spirit and scope of the invention.

As the thumb strap 11 slides easily on the wrist band 13 the device may be used on either hand. If it is used on the left hand the thumb need only be thrust between the thumb strap and wrist band while the latter is unbuckled and the wrist band then buckled about the wrist. If the steering wheel be on the right side of the automobile the four fingers may be inserted between the wrist band and thumb strap and the thumb strap buckled as before, the position of the mirror in either case being the same.

It will be apparent that a hand mirror embodying my invention may be easily positioned and in certain types of cars will automatically assume a position, as the hand of the driver grasps the wheel, to permit inspection of traffic conditions behind and at the side of the car adjacent the driver and that in those types of cars having small or low steering wheels the driver need only release the wheel and raise his hand slightly to see behind the car. It will be apparent also that the harness and mirror may be positioned upon the bare hand of the driver or may be secured over a hand wearing a glove.

The thumb strap lies close against the palm of the driver's hand and therefore does not interfere with the free use of the hand in operating the automobile or making repairs. The device is simple and may be cheaply constructed and as the mirror is located upon the back of the hand little opportunity is given to break it.

It will be apparent that various changes may be made in the form and construction of the parts and their arrangement without departing from the spirit and scope of the invention, or sacrificing any of its material advantages, the form hereinbefore described being merely a preferred embodiment thereof.

I claim:

1. A hand mirror for motorists and the like comprising a mirror, a holder for said mirror, a strap adapted to encircle the wrist of the wearer secured to one side of said holder, and a strap secured to the other side of said holder at one end and engaging the wrist strap at the other end and adapted to pass between the thumb and first finger to secure the mirror in place on the back of the hand and adjacent the thumb of the wearer.

2. A hand mirror for motorists and the like comprising a mirror, a strap adapted to encircle the wrist of the wearer connected to said mirror, and a strap adapted to pass between the thumb and first finger of the wearer connected to said mirror and slidably engaging said first mentioned strap, whereby said mirror may be positioned on the back of either hand of the wearer.

GEORGE W. MOSHER.

Witnesses:
J. C. CARPENTER,
FRANKLIN M. WARDEN.